(12) United States Patent
Muilenburg

(10) Patent No.: US 8,961,017 B2
(45) Date of Patent: Feb. 24, 2015

(54) SPLIT SLEEVE SHAFT REPAIR

(76) Inventor: Mike Muilenburg, Salina, KS (US)

( * ) Notice: Subject to any disclaimer, the term of this patent is extended or adjusted under 35 U.S.C. 154(b) by 0 days.

(21) Appl. No.: 13/363,425

(22) Filed: Feb. 1, 2012

(65) Prior Publication Data

US 2013/0192037 A1    Aug. 1, 2013

(51) Int. Cl.
*F16L 21/06*    (2006.01)

(52) U.S. Cl.
USPC ........... 384/281; 384/280; 384/276; 464/183; 138/99; 138/167

(58) Field of Classification Search
CPC ....... F16L 55/172; F16L 21/065; F16L 21/06; F16B 7/0426; F16D 1/04
USPC ......... 384/280, 281, 296, 295, 276, 428, 441, 384/627; 464/183, 182, 110, 125, 126; 285/15, 367, 419; 403/310, 312; 138/99, 167; 29/402.14, 402.15, 29/402.09, 402.04–402.06, 402.08, 29/402.19, 407.05, 463
See application file for complete search history.

(56) References Cited

U.S. PATENT DOCUMENTS

| | | | | |
|---|---|---|---|---|
| 111,152 A | * | 1/1871 | Smith | 403/312 |
| 157,427 A | * | 12/1874 | Stuart | 403/312 |
| 209,829 A | | 11/1878 | Nemelka | |
| 429,175 A | * | 6/1890 | Ogilvy | 464/183 |
| 516,602 A | * | 3/1894 | Kershaw | 464/182 |
| 1,559,546 A | * | 11/1925 | Bosket | 403/312 |
| 2,481,931 A | * | 9/1949 | Kester | 384/281 |
| 2,540,515 A | | 2/1951 | Gerner | |
| 2,635,015 A | | 4/1953 | Babb | |
| 2,759,493 A | * | 8/1956 | Risley et al. | 138/99 |
| 3,137,933 A | | 6/1964 | Hitchcock et al. | |
| 3,396,753 A | * | 8/1968 | Foster et al. | 138/99 |
| 3,620,041 A | | 11/1971 | Waddell et al. | |
| 3,851,983 A | * | 12/1974 | MacKenzie | 403/312 |
| 4,196,786 A | * | 4/1980 | Hornig et al. | 180/337 |
| 4,284,298 A | * | 8/1981 | Kaufmann, Jr. | 285/302 |
| 4,690,574 A | | 9/1987 | Green | |

(Continued)

FOREIGN PATENT DOCUMENTS

DE    3245358 A1 *  6/1984
JP    61017711 A  *  1/1986

OTHER PUBLICATIONS

Selecting Cooper split bearings; Cooper Bearings Internet web site; http://www.cooperbearings.com/products.asp.

(Continued)

*Primary Examiner* — Daniel Yabut
(74) *Attorney, Agent, or Firm* — Jeffrey L. Thompson; Thompson & Thompson, P.A.

(57) ABSTRACT

A sleeve for use in repairing a shaft having an unworn diameter and a worn diameter, the sleeve providing a fresh bearing surface for a split roller bearing, comprising: two halves which, when joined, define a cylinder having a diameter adapted to firmly engage a portion of unworn diameter shaft at each end; bolts holes adapted to releasably affix the halves together, and bolts adapted to attach the halves thereby; joiner pin holes defined in at least one intersection between the halves, the joiner holes adapted to receive joiner pins therein and adapted to serve as a stable joinder point for the halves, and joiner pins adapted to be firmly engaged therein; a smooth bearing surface defined on an external surface of the sleeve; and a split roller bearing adapted to engage the bearing surface. A method for field manufacture of said sleeve.

10 Claims, 4 Drawing Sheets

(56) References Cited

U.S. PATENT DOCUMENTS

| | | | |
|---|---|---|---|
| 5,062,720 A | 11/1991 | Hall et al. | |
| 5,375,934 A | 12/1994 | Hall et al. | |
| 6,095,784 A | 8/2000 | Wickizer | |
| 6,125,713 A * | 10/2000 | Langlois et al. | 29/402.08 |
| 6,824,471 B2 * | 11/2004 | Kamenov | 464/182 |
| 7,066,210 B2 * | 6/2006 | Kakoschke et al. | 138/99 |
| 7,118,300 B2 * | 10/2006 | Bacskay | 403/312 |
| 7,198,465 B1 * | 4/2007 | Ichiryu | 285/187 |
| 8,210,210 B2 * | 7/2012 | Clark et al. | 138/97 |
| 2010/0104357 A1 * | 4/2010 | Al-Tuhami et al. | 403/312 |
| 2012/0306191 A1 * | 12/2012 | Smith | 285/15 |

OTHER PUBLICATIONS

Split Roller Bearing; Luoyang Jiawei Bearing Manufacture Co., Ltd. Internet web site; http://lyjwbearings.en.made-in-china.com/product/tqzQiEhVJoUC/China-Split-Roller-Bearing.html.

Split Spherical Roller Bearings; Luoyang SBI Special Bearing Co., Ltd. Internet web site; http://www.sbibearings.com/10-spherical-roller-bearing.html.

* cited by examiner

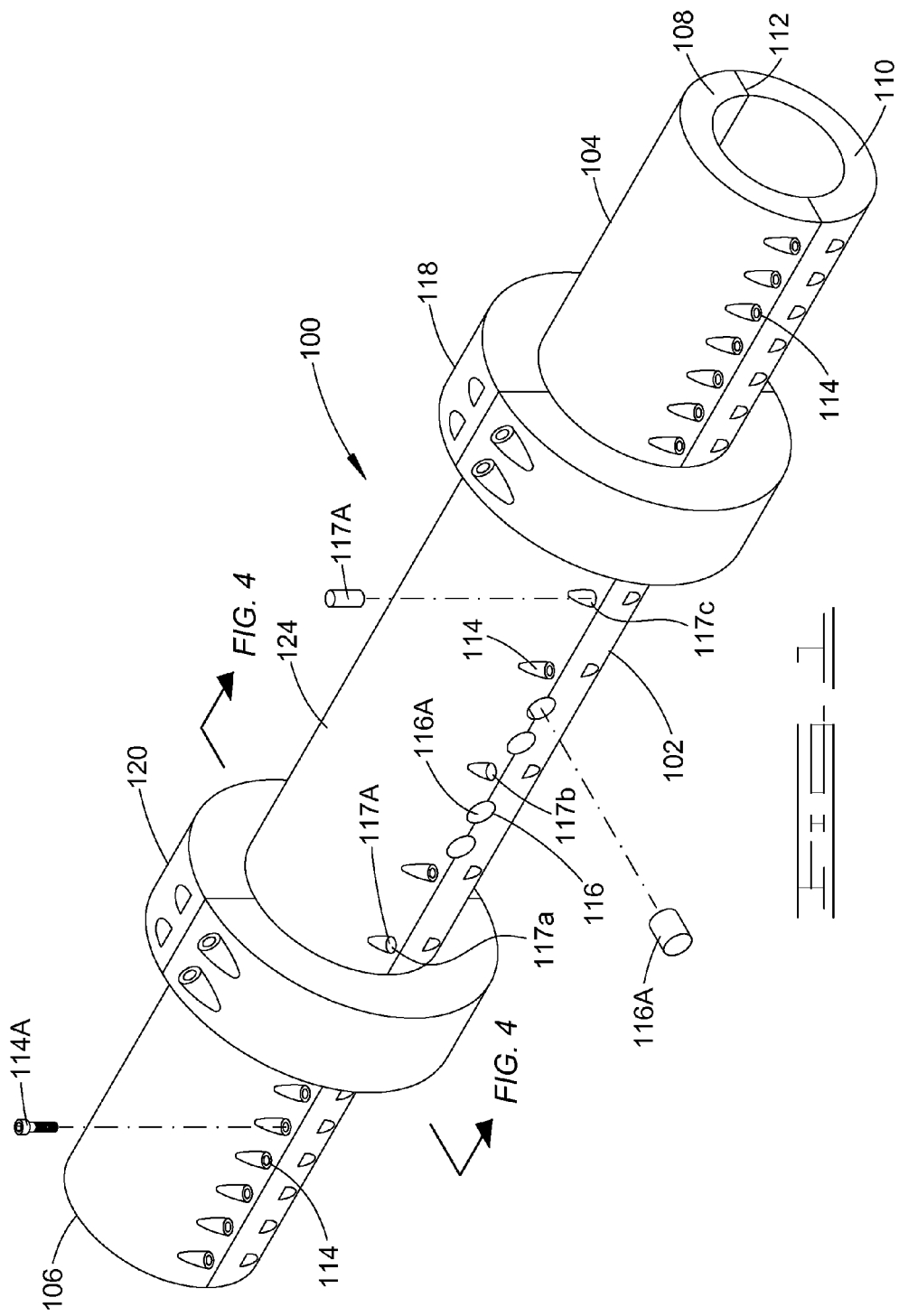

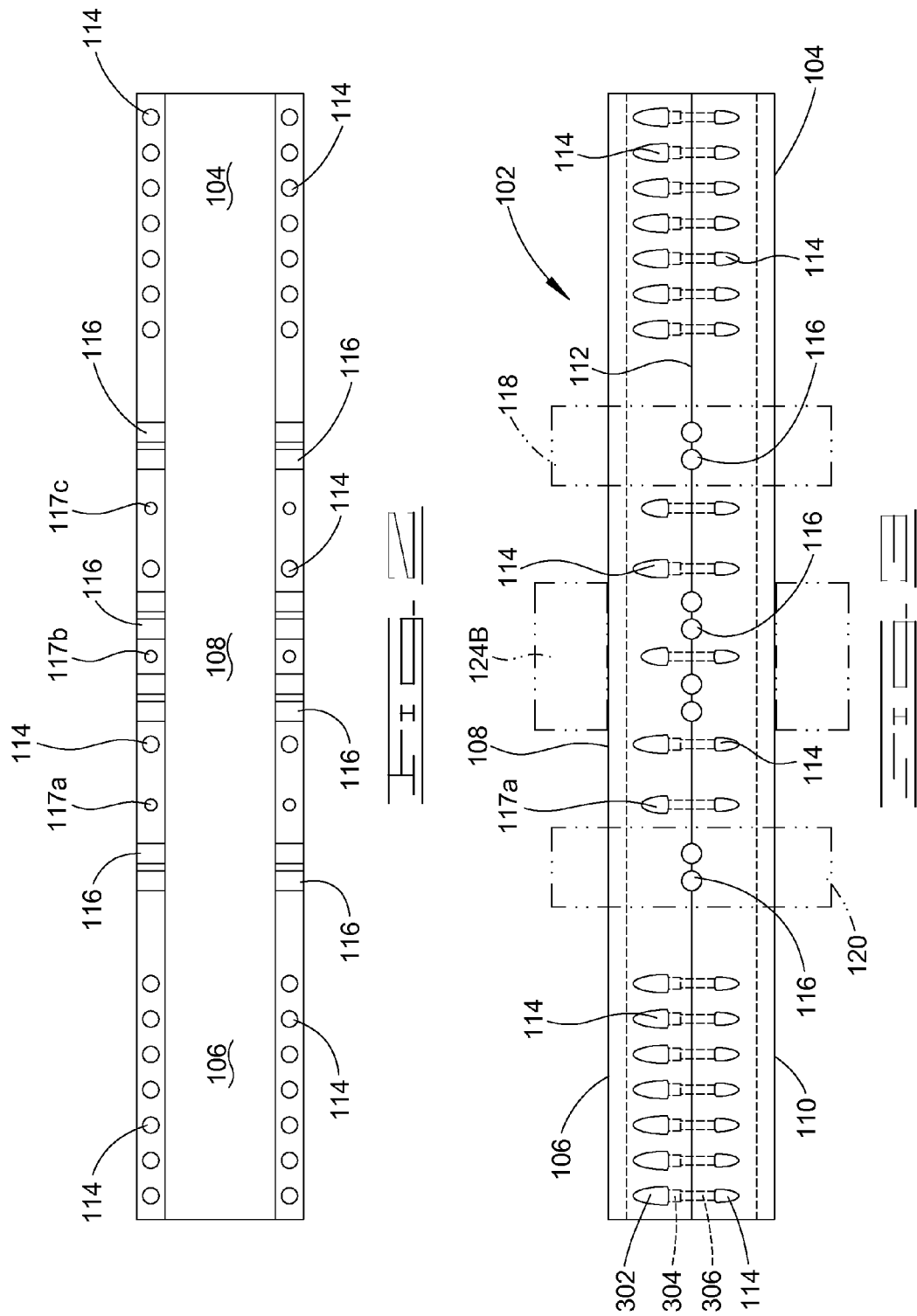

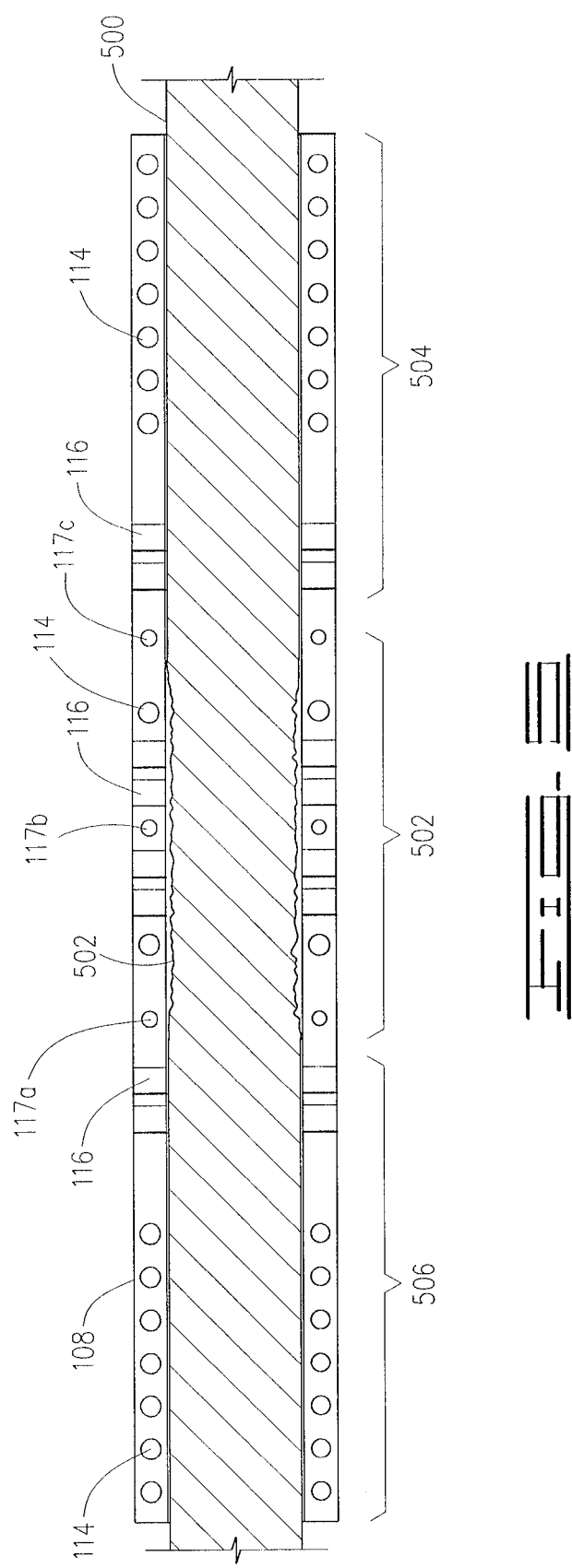

SPLIT SLEEVE SHAFT REPAIR

CROSS-REFERENCE TO RELATED APPLICATIONS

None.

FIELD OF THE INVENTION

The invention relates to bearings, and more particularly to devices and methods for reconditioning damaged shafts and bearings that operate thereon.

SUMMARY OF THE INVENTION

It is well known that over time, mechanical parts in high-speed operation wear. In particular, bearings that operate against a portion of a shaft tend to wear out themselves and to also wear out portions of the shaft against which they operate. Prior approaches to deal with this issue involve the use of bearings that were sacrificial. In other words, the bearing was soft enough so that it preferentially wore away instead of eroding the shafts. That way, once the bearing was worn to a sufficient degree, it could be replaced, and there would have been minimal damage at that point to the shaft.

The sacrificial bearing traditionally used in these sorts of operations has been called a "Babbitt" bearing. Babbitt bearings are named after Isaac Babbitt, who invented them in roughly 1839 in Massachusetts. While other formulations for Babbitt bearings have developed over the years, they are generally comprised of a multi-metal composition with resistance to galling. Material of a Babbitt bearing is soft and easily damaged, but it is made up of hard metal crystals dispersed in a softer metal. This sort of composition is called a metal matrix composite, and as the bearing wears the softer material erodes creating paths for lubricants to pass between high spots comprised of hard metal crystals, which constitute the actual bearing surface. Common Babbitt bearing compositions including 90 percent tin and 10 percent copper, or alternatively 89 percent tin, 7 percent antimony and 4 percent copper. Lead may also be used as a Babbitt material but it tends to work harden and can develop cracks. These Babbitt bearings allow for operation of a shaft bearing a load to spin at rapid speed for long periods of time. Once a Babbitt bearing wears out, another can be poured in place without the need to remove the shaft.

However, even bearings that are sacrificially soft and intended not to wear a shaft eventually do so. At some point, the shaft becomes so damaged that it is no longer sufficient to simply replace the bearing that operates against the shaft. Rather, the shaft itself must be repaired/reconditioned or ultimately replaced to address the problems.

Once a shaft has begun to wear to the point where a Babbitt bearing can no longer operate in conjunction with its surface, the options include replacing the shaft altogether. This is often a very expensive and time-consuming process as the shaft may be tens or even hundreds of feet long, and replacing it may run into hundreds of thousands or even millions of dollars in direct costs. In addition to the direct costs there are the cost of shutting down the machinery operated by the shaft. The loss associated with machine down-time is often many times the cause the direct cost to replace the shaft.

Another alternative at the point where the shaft is worn to the extent where a Babbitt bearing can no longer function in conjunction with its surface is to build up the worn area by welding or otherwise adding material to the surface of the shaft. This approach is functional, but it is difficult and expensive to add material to the shaft in place. If the shaft has to be removed from service to add the material to the worn spot, the problems associated with loss of use of the equipment are encountered. Adding material in the field is difficult because machining the final surface to an appropriate level of roundness and smoothness is difficult.

There are many industrial applications in which long line shafts and sacrificial bearings are used including, but not limited to: drive shafts in boats; rock quarries and processing operations; mills, such as flour mills; electrical generators; and many others. One example of the field in which the present invention is used is mills for grinding flour. Flourmills typically have long line shafts that are supported with Babbitt bearing housings at approximately 7 feet intervals along a shaft. These Babbitt bearings are oil lubricated. Once one or more of these Babbitt bearing surfaces on the shaft becomes worn to a sufficient agree, pouring additional new Babbitt bearings is no longer appropriate or effective. Replacing the shaft in these mills can take up to a week or two of down time and put the equipment out of service during that time. That is not a cost effective option in the milling industry.

An example of the use of the present invention involves one of these flourmill shafts. A shaft having an original diameter of 2 15/16 inches or 2.9375 inches may have worn down over the years to approximately 2.9 inches. The worn area eroded by long-term contact with Babbitt bearing, may be approximately 10 inches long. Therefore, a repair sleeve on the order of 22 inches long may be desirable providing contact with 6 inches of good shaft to clamp the sleeve onto on either side of the 10 inch worn area. The sleeve, may have an outside diameter of circa 3.9375 inches, and an inside diameter to 2.9375 inches, matching the diameter of the shaft before it was worn down. Thus, the sleeve would have a wall thickness of ½ inch. The thickness of the wall can be varied to obtain an outside diameter corresponding to commercially available sizes of split roller bearings. Split roller bearings are available from a wide variety of commercial suppliers such as Cooper, and an example description of Cooper's split roller bearing products is shown in a printout from their web site submitted in an information disclosure statement to be submitted in conjunction with this patent application. Other split roller bearings are available from Luoyang Jiawei Bearing Manufacture Co., Ltd., and a printout from their web site will also be submitted with the information disclosure statement as are printouts from web sites of other manufacturers. The teachings of these commercially-available split roller bearing manufacturers regarding construction and installation of split roller bearings is incorporated herein by reference. Alternatively, a custom size of split roller bearing can be obtained corresponding to the outside diameter of the sleeve. A plurality of dowel holes are machined into the sleeve on two lines, 180 degrees offset from one another, along which lines the sleeve will be cut into two halves. After the sleeve is cut into two halves, a plurality of dowels placed in the hole locations will serve to hold the halves of the sleeve in place relative to one another.

In the foregoing example, there are preferably eight of the dowels in the holes between the two halves of the sleeve on each side. The total number of the dowels is 16. Four of the dowels on each side are in the clear area in which a bearing will ultimately operate. Four of the dowels may ultimately located under optional clamp rings. Thus, on one side of the split sleeve there are eight dowels, four being in the clear and four being under the clamp rings and 180 degrees from those eight there are a mirror image set of eight dowels. The exact number and location of the dowel pins is not crucial to the invention. Rather, the important thing is that the dowels operate to maintain the halves of the sleeve in a fixed relation one to another.

Once machined, the sleeve is centrally located over the worn area of the shaft. In the example described, the middle 10 inches of the sleeve covers the 10 inches of worn shaft. Once the sleeve is attached to the shaft, a split roller bearing is mounted to an external surface of the sleeve and it provides the operational bearing for use with the shaft. Split roller bearings are designed to be mounted on the shaft without having to remove the shaft to replace or modify the split roller bearing. Another advantage to the present invention is that it eliminates the use of grease oil to lubricate the bearing. For the old Babbitt-type bearings lubricant oil was required. In installations such as the milling industry with powdery flour, the use of oil was a problem because it created the opportunity for buildup or for buildup of material on the mechanical workings, or it alternatively provided the possibility that flour could be contaminated with lubricating oils. Use of the split roller bearing mounted on the shaft as shown in the invention, prevents the possibility of either contamination of food stuffs by oils or the powdery materials getting into the bearing surfaces.

The first step in creating a sleeve for use in the invention is to determine the dimensions of the worn section of the shaft. Prior to taking measurements, however, it is generally desirable to remove any high spots on the worn section of the shaft. The shaft should be as round as possible with field modification. Differences in diameter of the worn section of shaft are acceptable so long as it is a matter of taper and not out of roundness. Out of roundness will produce vibration that may cause problems for the repair. Thus, the first step is smoothing out worn areas so that they have an acceptable degree of taper, but minimal out of roundness.

Once the profile of the worn shaft is smoothed as described above, a micrometer is used to determine the diameter of the shaft along the unworn portion. This will result in a known diameter profile along the length of the unworn section on either side of the worn section.

A dummy shaft is then cut that approximates the recorded measurements of the shaft in the field. The shaft should also be a little bit longer than the proposed length of the sleeve to allow for the dummy shaft to be clamped in the chucks of a lathe. The dummy shaft is clamped in a lathe, and the dimensions of the shaft as measured in the field are reproduced along the length of the dummy shaft. At the end of this operation, the dummy shaft is clamped in chucks in a lathe in the shop having the same dimensions and length of the section of the shaft in the field that will receive the sleeve.

The next step is to obtain a tubing section that is larger on the outside diameter and smaller on the inside diameter than is needed for the sleeve to be produced. The length is cut to the desired length of the sleeve. Each end of the sleeve is bored inside to the internal dimensions desired to engage the unworn portion of the shaft along the portion of the sleeve that will engage that shaft. This bore should be very smooth to allow for frictional engagement of the sleeve with the unworn portion of the shaft at each end of the worn portion of the worn section to be covered. The portion of the sleeve that will rest over the worn portion of the shaft can and should be bored to a slightly smaller diameter, but the diameter of the sleeve overlying the worn portion must be large enough so it will not contact the worn portion of the shaft in operation once it is installed thereon.

Along the first periphery of the sleeve a plurality of bolt holes are drilled and reamed. Along a second periphery of the shaft of the sleeve, a segment, in preferably equal number of bolt holes are drilled and reamed. Once the sleeve is split down the middle, these bolt holes will serve to connect the pieces back together in operation.

A plurality of dowel holes are also drilled prior to splitting the halves of the sleeve. A second set of dowel pin holes are drilled at 180 degrees from this first set of dowel holes for a mirror image set of pins. Dowels, once the halves are split, will serve to hold the halves in steady place with respect to one another when dowels are placed therein.

The next step is to cut the tube in half along the lines of the dowel holes. The cut should pass through the center point of the dowel holes. After cutting, the edges of each half are de-burred, and it is particularly important to pay close attention to the dowel holes and to ensure that there are no burrs on or near them.

If the optional split clamp rings are used, they are next manufactured and affixed to an external portion of the sleeve. Clamp rings are in frictional engagement with the outer surface of the sleeve as it is installed. They are held together by at least one bolt. The joint of the split clamp rings should be at 180 degrees to the cut in the sleeve.

The dowel pins to be mounted into the dowel holes between the halves of the sleeve are prepared. Each of the dowel pins must be cut to ensure that they are short enough to not protrude past the outer diameter of the sleeve in operation. The sleeve including the dowel pins is then installed on the dummy shaft bolts are inserted, and the desired outside diameter of the shaft is machined. The outside diameter will be machined to match the available split roller bearing.

While the sleeve is mounted on the dummy shaft, it should be smoothed and de-burred to the maximum extent possible to provide a smooth bearing surface.

If the clamp rings are used, they should be put in place on the sleeve mounted on the dummy shaft, and their operation should also be tested. They need to be checked for manufacturing defects and the defects need to be corrected in the shop before taking the sleeve and the optional clamp rings for installation in the field. The clamp rings, if used, shall be marked at this point at their location on the shaft should be marked once acceptable operation is obtained so that in the field they can simply be reinstalled to the same point and the operation should be smooth at that juncture.

The sleeve and the clamp rings if used are now at that point are ready for installation in the field.

The equipment, along with the selected split roller bearing, are then installed on the shaft in the field. The split roller bearing that had been selected will have an internal mounting diameter equal to the exterior diameter of the sleeve.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DESCRIPTION OF THE DRAWINGS

FIG. 1 is a perspective view of one embodiment the invention.

FIG. 2 is a side view of one half of a sleeve.

FIG. 3 is a side view of one embodiment of the sleeve.

FIG. 5 is a cross-sectional side view of one half of a sleeve installed on a worn shaft.

DETAILED DESCRIPTION OF THE INVENTION

Figure 4:
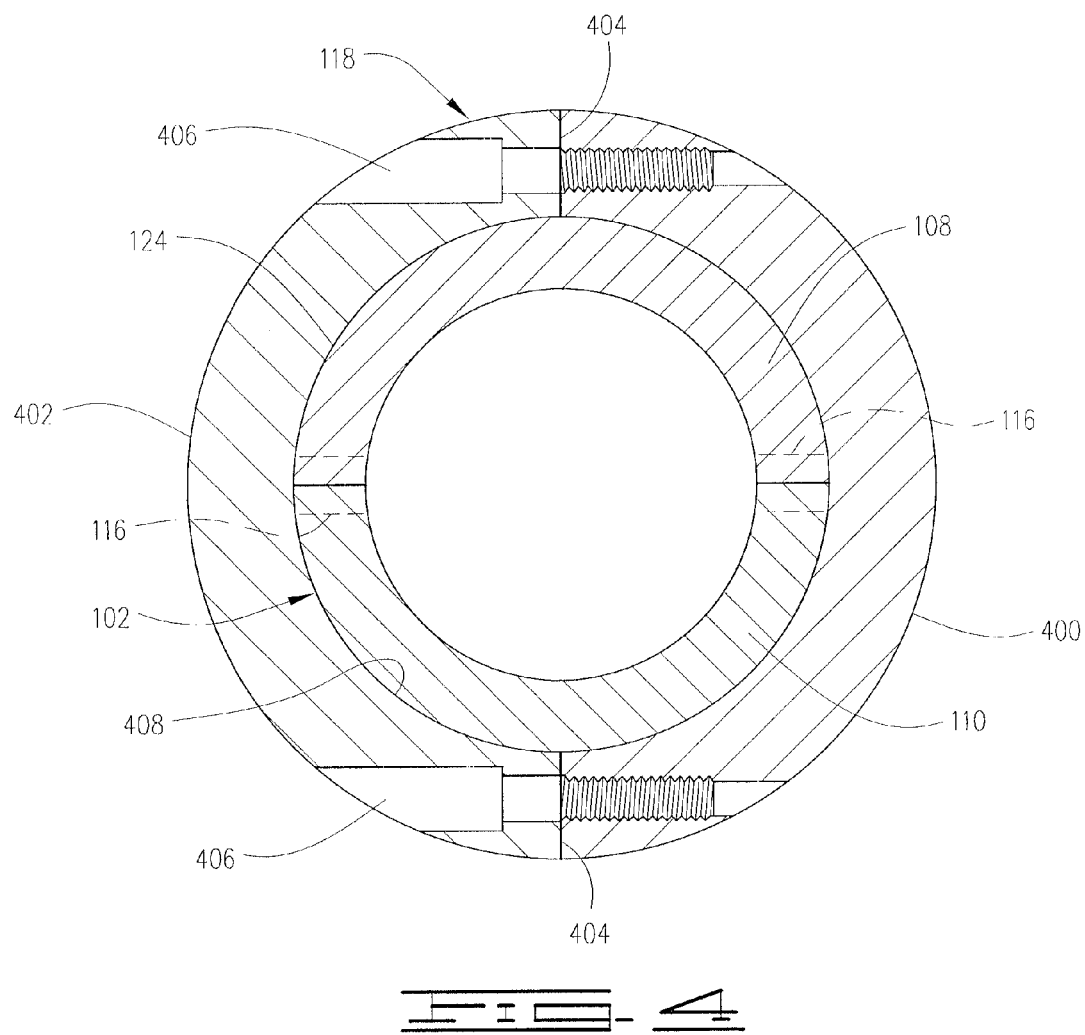
FIG. 4 is a cross-sectional side view of an embodiment of an optional clamp ring.

FIG. 1 is a perspective view of one embodiment of the invention disclosed herein. Shown in FIG. 1 is a repair sleeve assembly 100. The sleeve 102 has a first end 104 and a second end 106. The sleeve is comprised of a first half 108 and a second half 110. Each half has a respective first and second end. Between the two halves, there is an interface 112. The interface 112 is created when halves are cut in a step described generally above in the overview of the invention.

Defined in each half are bolt holes 114. The bolt holes 114 are designed to receive bolts 114A to hold the two halves together in operation. As can be seen in FIG. 3, in the illustrated embodiment, there are shown 16 bolt holes on each side of the sleeve 102. The bolt holes 114 each have a centerline axis that extends perpendicular to a respective radial line of the cylinder. The centerline axis of each bolt hole 114 is also perpendicular to a longitudinal line that extends parallel with the longitudinal centerline of the cylinder and intersects with the respective radial line.

Dowel holes 116 are defined at the interface 112. The dowel holes 116 are each cylindrical with a first semi-cylindrical portion defined on one of the sleeve halves 108 and a second semi-cylindrical portion defined on the other sleeve halve 110. The dowel holes 116 each have a longitudinal centerline axis that extends along a respective radial line of the cylinder. The longitudinal centerline axes of the dowel holes 116 are perpendicular with the centerline axes of the bolt holes 114. Before the sleeve 102 is cut, in a step generally described above, the dowel holes 116 were drilled into the uncut sleeve. After the sleeve has been cut into two portions, the dowel holes 116 appear as semi-cylindrical grooves in a corresponding edge of the sleeve halves 108 and 110 and are adapted to maintain them secure in non-moving engagement with one another when dowels 116A are placed therein. A plurality of tangential dowel holes, labeled on FIG. 1 as 117a-c, are defined perpendicular to the dowel holes 116 for receiving dowels 117A. The tangential dowel holes 117 pass through both halves 108 and 110, and their path is generally parallel to a line defined by the bolt holes 114.

Two optional clamp rings 118 and 120 are shown to provide additional support to maintain each half 108 and 110 in secure engagement. The sleeve 102, when finalized has a smooth outer surface 124 adapted to rotatably engage a split bearing 124B. The optional clamp rings engage this smooth outer surface 124 with a split in their construction rotated 90 degrees from the interface 112, which reinforces the connection between the halves 108 and 110.

FIG. 2 shows a side view of a first half 108. An interior surface of the first half 108 can be seen, and it has a first end 104 and a second end 106. Each of these ends is adapted to engage a corresponding unworn portion of the shaft. See FIGS. 5 at 504 and 506. Bolt holes 114 and dowel slots 116 can be seen defined in the first half 108 as shown.

FIG. 3 is a side view of the sleeve 102 showing the first end 104 and the second end 106. The top portion as shown is the first half 108 and the bottom half is 110, which is the second half of the sleeve 102. The interface 112 is shown at the midpoint between the two halves. Bolt holes 114 and dowel holes 116 can be seen. In this rotation, the dowel holes 116 appear as circles when forced together at the interface at 112. Each of the bolt holes 114 have a larger portion 302, a shoulder portion 304, and a threaded portion 306. The larger portion and the shoulder portion are defined in the second half 110 as shown, and the threaded portion 306 is defined in the first half 108. The threads of bolts inserted therein pass smoothly through the larger portion 302, and a shoulder of the bolt engages against the shoulder portion 304. The threads of the bolt engage the threaded portion 306.

FIG. 4 shows one of the optional clamp rings 118. It has a first piece 400 and a second piece 402. There is a split 404 between the two pieces. As with the sleeve itself, the clamp rings are held together by bolts engaging through bolt holes 406. There is an inner surface 408 of the clamp rings adapted to grippingly engage the smooth outer surface 124 of the sleeve 102. FIG. 4 also shows with dashed lines the location of dowel holes 116.

FIG. 5 shows a first half 108 of the sleeve 102 installed on a shaft 500. The shaft has a worn portion 502, and on either end of the worn portion 502, is a first unworn portion 504 and a second unworn portion 506. The first half 108 is adapted, when mated with the second half 110, to securely engage the unworn portions 504 and 506 on either end of the worn portion 502 of the shaft 500. The bolt holes 114 and dowel holes 116 can be seen in this view.

The purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

While the invention has been shown, illustrated, described and disclosed in terms of specific embodiments or modifications, the scope of the invention should not be deemed to be limited by the precise embodiments or modifications therein shown, illustrated, described or disclosed. Such other embodiments or modifications are intended to be reserved especially as they fall within the scope of the claims herein appended.

Having thus described the invention, I claim:

1. A sleeve for use in repairing a shaft having an unworn diameter and a worn diameter along a portion of a length of the shaft resulting from bearing operation thereon, the sleeve providing a bearing surface for a split bearing, and the sleeve comprising:
   a. the sleeve having two halves, each with a substantially identical length, and the halves, when joined, defining a cylinder with a longitudinal centerline, said sleeve having an inner diameter adapted to firmly engage a portion of the unworn diameter of the shaft at each end of the sleeve;
   b. a plurality of bolt holes machined into each of the sleeve halves adapted to releasably affix the halves together, each of said bolt holes having a centerline axis that extends perpendicular to respective first radial lines of said cylinder, and said centerline axis of each bolt hole also being perpendicular to a longitudinal line that extends parallel with the longitudinal centerline of the cylinder and intersects with said respective first radial lines, and bolts received in said bolt holes for attaching the halves together;
   c. a plurality of dowel holes defined in at least one intersection between the halves, said dowel holes each being cylindrical with a first semi-cylindrical portion defined on one of the sleeve halves and a second semi-cylindrical portion defined on the other sleeve halve, said dowel holes each having a longitudinal centerline axis that extends along respective second radial lines of said cylinder, the longitudinal centerline axes of said dowel holes being perpendicular with a plane containing the centerline axes of said bolt holes, and dowels received in the dowel holes to maintain said halves in non-moving engagement with one another;
   d. the bearing surface defined on an external surface of the sleeve;
   e. the split bearing adapted to engage the bearing surface; and
   f. said sleeve being split into said two halves along a plane that is perpendicular to the centerline axes of said bolt holes and coplanar with the longitudinal centerline axes of said dowel holes.

2. The sleeve of claim 1, further comprising an external clamp means adjoining the bearing surface for providing additional security of the bond between the two halves of the sleeve.

3. A sleeve assembly for use in repairing a shaft having an unworn diameter and a worn diameter along a portion of a length of the shaft resulting from bearing operation thereon, the sleeve assembly comprising:
   a split sleeve comprising two semi cylindrical halves joined together to define a cylinder with a longitudinal centerline, said sleeve having an inner diameter adapted to firmly engage a portion of the unworn diameter of the shaft at each end of the sleeve and an outer diameter that provides an external bearing surface for use with a split bearing, said sleeve halves each having first and second edges extending in an axial direction that form respective first and second interfaces between said sleeve halves when the sleeve halves are joined together;
   a plurality of tangential bolt holes machined into each of the sleeve halves, each of said bolt holes having a centerline axis that extends perpendicular to respective first radial lines of said cylinder, and said centerline axis of each bolt hole also being perpendicular to a longitudinal line that extends parallel with the longitudinal centerline of the cylinder and intersects with said respective first radial lines, and a plurality of bolts received in the bolt holes for holding the two sleeve halves together;
   a plurality of first dowel holes defined at said interfaces between said sleeve halves, said first dowel holes each being cylindrical with a first semi-cylindrical portion defined on one of the sleeve halves and a second semi-cylindrical portion defined on the other sleeve halve, said dowel holes each having a longitudinal centerline axis that extends along respective second radial lines of said cylinder, the longitudinal centerline axes of said first dowel holes being perpendicular with a plane containing the centerline axes of said tangential bolt holes, and a plurality of first cylindrical dowels received in said first dowel holes to maintain the sleeve halves in non-moving engagement with one another; and
   said sleeve being split into said two semi cylindrical halves along a plane that is perpendicular to the centerline axes of said bolt holes and coplanar with the longitudinal centerline axes of said first dowel holes.

4. The sleeve assembly according to claim 3, further comprising a plurality of second dowel holes extending in a tangential direction through the sleeve halves, said second dowel holes being parallel with said bolt holes and perpendicular to a plane containing said first dowel holes, and a plurality of second dowels received in said second dowel holes.

5. The sleeve assembly according to claim 3, further comprising first and second external clamp rings that clamp over an external surface of said split sleeve to provide additional support for maintaining the sleeve halves in secure engagement with each other.

6. The sleeve assembly according to 5, wherein said external clamp rings each comprises a split clamp ring assembly held together by at least one bolt and having a joint that is offset from the interfaces between said sleeve halves.

7. The sleeve assembly according to 5, wherein said first dowel holes and said first dowels are located in portions of said sleeve assembly covered by said first and second external clamp rings.

8. The sleeve assembly according to claim 3, wherein said first dowels have a length that is less than a thickness of said sleeve so that the first dowels do not protrude past the outer diameter of the sleeve in operation.

9. The sleeve assembly according to 3, wherein said first dowel holes are located in a portion of said sleeve assembly containing said external bearing surface so that said first dowel holes and first dowels are covered by the split bearing.

10. The sleeve assembly according to 3, wherein said plurality of tangential bolt holes each comprises a larger head-receiving portion, a shoulder portion and a threaded portion.

* * * * *